United States Patent [19]

Recker et al.

[11] 4,251,427

[45] Feb. 17, 1981

[54] COATING COMPOSITIONS FROM POLYURETHANES CONTAINING A MOLECULAR SIEVE OF THE SODIUM ALUMINUM SILICATE TYPE

[75] Inventors: Klaus Recker, Cologne; Gerd Reinecke, Bergisch-Gladbach, both of Fed. Rep. of Germany

[73] Assignee: Bayer Aktiengesellschaft, Leverkusen, Fed. Rep. of Germany

[21] Appl. No.: 76,703

[22] Filed: Sep. 18, 1979

[30] Foreign Application Priority Data

Sep. 30, 1978 [DE] Fed. Rep. of Germany ....... 2842805

[51] Int. Cl.$^3$ .............................................. C08L 75/04
[52] U.S. Cl. ................. 260/37 N; 427/393.5; 528/48; 528/57; 528/67; 528/76; 528/77; 528/81; 528/83; 528/84; 528/85; 525/457
[58] Field of Search ................ 260/37 N; 528/84, 48, 528/57, 67, 76, 77, 81, 83, 85; 428/425; 427/385 R

[56] References Cited

U.S. PATENT DOCUMENTS

| | | | |
|---|---|---|---|
| 3,326,844 | 6/1967 | Gruber | 260/40 |
| 3,475,200 | 10/1969 | Kallert et al. | 138/137 |
| 4,066,397 | 1/1978 | Carroll | 528/77 |
| 4,094,842 | 6/1978 | Wenzel et al. | 528/67 |
| 4,154,716 | 5/1979 | Olstowski et al. | 260/37 N |

FOREIGN PATENT DOCUMENTS

| | | |
|---|---|---|
| 1504690 | 5/1970 | Fed. Rep. of Germany . |
| 1267968 | 3/1972 | United Kingdom . |
| 1365567 | 9/1974 | United Kingdom . |

*Primary Examiner*—Maurice J. Welsh
*Attorney, Agent, or Firm*—Gene Harsh; Lawrence S. Pope

[57] ABSTRACT

A substantially solvent-free fast low temperature curing polyurethane coating composition is disclosed as well as a procedure for synthesizing it and a procedure for applying it to a flexible substrate. It has a long shelf-life yet cures in about 1 to 5 minutes at temperatures of between about 80° and 180° C. to give a flexible coating. The composition is a mixture of a polyisocyanate melting at more than about 100° C. and a hydroxyl bearing polyurethane prepolymer based upon branched polyethers, monomeric glycols, and polyamines made with a deficit of polyisocyanate. The composition includes an isocyanate addition catalyst and a sodium aluminum silicate type molecular sieve and may include a polyester polyol as an additive or a reactant in forming the prepolymer.

4 Claims, No Drawings

COATING COMPOSITIONS FROM POLYURETHANES CONTAINING A MOLECULAR SIEVE OF THE SODIUM ALUMINUM SILICATE TYPE

FIELD OF THE INVENTION

This invention relates to improved, substantially solvent-free polyurethane reactive systems which can be used in doctor coating processes and which have a long pot-life, which systems are suitable for the coating of fabrics or other substrates.

BACKGROUND OF THE INVENTION

A process for coating fabric tubes is known from German Auslegeschrift No. 1,504,690, in which polymeric solutions are initially doctored onto the fabric in a thin layer and the coatings are subsequently dried by heating the tube. This process does, however, have two serious disadvantages. The tube has to be heated from the inside in order to impart a bubble-free surface to the fabric coating and this means an additional outlay on apparatus. Moreover, the presence of solvents makes processing more difficult since numerous measures have to be taken to suck off the solvent vapors, and processing plants which are protected from explosion are needed.

A process for coating fabric tubes with solvent-free systems (application of a polymer melt) is described in German Pat. No. 1,778,877. A disadvantage of this process is the high temperatures of about 200° C. needed for processing thermoplastic materials. The melt bath, pipe work and stripping apparatus have to be kept at this high temperature level. In addition, the deeper penetration of the plastic coating into the fabric induced by the process causes marked stiffening of the material so that the finished tube becomes more difficult to handle.

Solvent-free reactive polyurethane compositions for coating fabrics, which are stable in storage, are described in German Offenlegungsschrift No. 1,570,48 and U.S. Pat. No. 3,475,200 and are composed of polyhydroxyl compounds, uretdione diisocyanates which melt above 100° C. and chain extenders which melt above 80° C. Although coating pastes of this type are stable in storage over relatively long periods of time, they need uneconomically long reaction times (for example, 90 minutes at 110° C.) in order to cure completely.

The object of the invention is therefore to avoid the disadvantages described above of the known processes for coating fabrics—presence of solvent; too short pot-life; high processing temperatures and long curing times and simultaneously to allow simple and problem-free handling of the coating compositions.

This object is achieved by the polyurethane systems provided according to the invention.

SUMMARY OF THE INVENTION

The present invention relates to substantially solvent-free coating compositions which can be doctor-coated, comprising (A) about 5 to 30% by weight, preferably about 10 to 20% by weight of a polyisocyanate having a melting point above about 100° C., preferably above about 130° C., and (B) about 95 to 70% by weight, preferably about 90 to 80% by weight of a polyhydroxyl compound,
which are characterized in that component (B) represents a prepolymer, containing hydroxyl groups, prepared from
  (a) a polyisocyanate,
  (b) about 50 to 85% by weight preferably about 65 to 80% by weight, based on the sum of components b) to e), of a partially branched polyether polyol having a molecular weight of from about 1000 to 4500, preferably from about 2000 to 4000, particularly preferably about 3500,
  (c) about 0 to 10% by weight, preferably about 1 to 5% by weight, of a polyester polyol having a molecular weight of from about 500 to 2000, preferably from about 700 to 1200,
  (d) about 10 to 30% by weight, preferably about 15 to 25% by weight, of a glycol having a molecular weight of from about 62 to 250, preferably from about 76 to 150 and,
  (e) about 0.5 to 5% by weight, preferably about 1 to 2% by weight, of a compound containing at least two amino groups and having a molecular weight preferably below about 200,
wherein the equivalent ratio of component (a) to components (b) to (e) lies between about 0.25 and 0.65, preferably between about 0.35 and 0.60 particularly preferably between about 0.50 and 0.55, and wherein component (B) contains (f) about 1 to 4% by weight of a molecular sieve of the sodium aluminum silicate type and
  (g) about 0.1 to 5% by weight of an activator.

DETAILED DESCRIPTION OF THE INVENTION

Components A) and B) are preferably used in such proportions that the NCO/OH equivalent ratio including any masked NCO groups, which may be contained in component A) lies between about 0.9:1 and 1.5:1, particularly preferably between about 1.0:1 and 1.1:1.

The coating systems according to the invention have a very long pot-life and a relatively short curing time.

For the proposed applications of the reactive systems according to the invention, it is necessary for the criteria listed above with regard to the composition of component (B) to be observed.

If a polyether of linear structure is used instead of the partially branched polyether b), then uneconomically long curing times are obtained (Example 3). Polyethers containing predominantly secondary hydroxyl groups at the end of the chain are preferred since primary polyether polyols lead to too great a shortening of the pot-life (Example 4).

The addition of the polyester polyol c) is preferred according to the invention, since the viscosity of the paste would otherwise increase 24 hours after stirring in the solid diisocyanate (A) to such an extent that it would be extremely difficult or even impossible to process the mixture (Example 6).

The polyester polyol (c) does not however need to be chemically incorporated into the hydroxyl group containing prepolymer (B); it can also be added to the mixture of (A) and (B) as a third component.

It is necessary to incorporate a small amount of an amino-functional compound (e) in order to allow finely dispersed distribution of the rigid segment formed from short-chained glycol (d) and polyisocyanate (a). If the hydroxyl prepolymer is produced without the addition of diamine, coarse-particled suspensions which deposit sediments are obtained and these suspensions do not react in a reproducible manner and lead to a marked deterioration in the mechanical properties (Example 5).

It is necessary to add molecular sieves (f) in order to obtain bubble-free coatings. In addition, the storage stability of the finished coating paste is clearly improved. Coating pastes produced without the addition of molecular sieve (f) exhibit less storage stability at elevated temperatures. Example 7 illustrates this situation.

If the preliminary chain lengthening with the polyisocyanate (a) is omitted, acceptable processing times are obtained, but the coating turns out to be very soft and tacky and is unsuitable for practical purposes (Example 8).

Any polyisocyanates known per se (preferably diisocyanates) having a melting point above 100° C., preferably between 125° and 200° C., are suitable as component (A) of the coating compositions according to the invention. Examples of suitable polyisocyanates include 1,4-dichloro-2,5-diisocyanato-benzene; 1-chloro-4-methoxy-2,5-diisocyanato-benzene; 1,3-dimethoxy-4,6-diisocyanato-benzene; 3,3′-dimethoxy-4,4′-diisocyanato biphenyl; 2,5,2′,5′-tetramethyl-4,4′-diisocyanatodiphenyl methane; diphenyl sulphone 4,4′-diisocyanate; naphthylene-1,5-diisocyanate and the urea diisocyanate from 1 mol water and 2 mol 2,4-toluylene diisocyanate, the last three diisocyanates mentioned being preferred.

Diisocyanates containing one uretdione group, of the type formed by dimerization known per se of the polyisocyanates known in polyurethane chemistry are preferred according to the invention because they are solid polyisocyanates having a high melting point. Dimeric 2,4-toluylene diisocyanate is particularly preferred.

All polyisocyanates known per se are in principle suitable for use as isocyanate component a) in the production of the OH-prepolymer (component B) of the reactive systems according to the invention. These include aliphatic, cycloaliphatic, araliphatic, aromatic and heterocyclic polyisocyanates of the types described, for example, by W. Siefken in Justus Liebigs Annalen der Chemie, 562, pages 75 to 136, for example those corresponding to the formula

 Q (NCO)$_n$ in which
n=2 to 4, preferably 2, and
Q represents an aliphatic hydrocarbon radical containing 2 to 18, preferably 6 to 10 carbon atoms; a cycloaliphatic hydrocarbon radical containing 4 to 15, preferably 5 to 10 carbon atoms;
an aromatic hydrocarbon radical containing 6 to 15 preferably 5 to 13 carbon atoms or an araliphatic hydrocarbon radical containing 8 to 15, preferably 8 to 13 carbon atoms, for example, ethylene diisocyanate; 1,4-tetramethylene diisocyanate; 1,6-hexamethylene diisocyanate; 1,12dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanato methylcyclohexane (German Auslegeschrift No. 1,202,785 and U.S. Pat. No. 3,401,190 incorporated herein by reference), 2,4- and 2,6-hexahydrotoluylenediisocyanate and mixtures of these isomers, hexahydro-1,3- and/or -1,4-phenylene diisocyanate; perhydro-2,4′- and/or -4,4′-diphenyl methane diisocyanate; 1,3- and 1,4-phenylene diisocyanate; 2,4- and 2,6-toluylene diisocyanate and mixtures of these isomers; diphenyl methane 2,4′- and/or -4,4′-diisocyanate and naphthylene-1,5-diisocyanate.

Other suitable materials according to the invention include, for example: triphenylmethane-4,4′,4″-triisocyanate; polyphenyl:polymethylene polyisocyanates of the type which can be obtained by aniline-formaldehyde condensation and subsequent phosgenation and which are described, for example, in British Pat. Nos. 874,430 and 848,671; m- and p-isocyanatophenylsulphonyl isocyanates according to U.S. Pat. No. 3,454,606 incorporated herein by reference; perchlorinated aryl polyisocyanates of the type described for example, in German Auslegeschrift No. 1,157,601 (U.S. Pat. No. 3,277,138 incorporated herein by reference); polyisocyanates containing carbodiimide groups of the type described in German Pat. No. 1,092,007 (U.S. Pat. No. 3,152,162 incorporated herein by reference) and in German Offenlegungsschriften Nos. 2,504,400; 2,537,685 and 2,552,350; norbornane-diisocyanates according to U.S. Pat. No. 3,492,330 incorporated herein by reference; polyisocyanates containing allophanate groups of the type described, for example, in British Pat. No. 994,890, Belgian Pat. No. 761,626 and Netherlands Pat. Application No. 7,102,524; polyisocyanates containing isocyanurate groups of the type described, for example, in U.S. Pat. No. 3,001,973 incorporated herein by reference, German Pat. Nos. 1,022,789, 1,222,067 and 1,027,394 and German Offenlegungsschriften Nos. 1,929,034 and 2,004,048; polyisocyanates containing urethane groups of the type described, for example in Belgian Pat. No. 752,261 or U.S. Pat. Nos. 3,394,164 and 3,644,457 both incorporated herein by reference; polyisocyanates containing acrylated urea groups according to German Pat. No. 1,230,778; polyisocyanates containing biuret groups of the type described, for example, in U.S. Pat. Nos. 3,124,605 and 3,201,376 both incorporated herein by reference and British Pat. No. 889,050; polyisocyanates produced by telomerization reactions of the type described, for example, in U.S. Pat. No. 3,654,106 incorporated herein by reference; polyisocyanates containing ester groups of the type listed, for example, in British Pat. Nos. 965,474 and 1,072,956; U.S. Pat. No. 3,567,763 incorporated herein by reference and German Pat. No. 1,231,688, reaction products of the above-mentioned isocyanates with acetylene according to German Pat. No. 1,072,385 and polyisocyanates containing polymeric fatty acid esters according to U.S. Pat. No. 3,455,883 incorporated herein by reference.

It is also possible to use the distillation residues produced during the commerical production of isocyanate and containing isocyanate groups, which may be dissolved in one or more of the above-mentioned polyisocyanates. Moreover, it is possible to use mixtures of the abovementioned polyisocyanates.

The polyisocyanates which are easy to obtain commercially are generally preferred, for example, 2,4- and 2,6-toluylene diisocyanate as well as mixtures of these isomers ("TDI"), polyphenyl-polymethylene polyisocyanates, of the type produced by aniline formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene diisocyanates or from 4,4'- and/or 2,4'-diphenyl methane diisocyanate.

The isomeric toluylene diisocyanates are particularly preferred.

Partially branched polyether polyols are used as component b) with the structure of the hydroxyl prepolymer B), these partially branched polyether polyols preferably having an average hydroxyl functionality of from about 2.5 to 3.0 and an average molecular weight ($\overline{Mn}$) of from about 2000 to 4000, particularly preferably about 3500. These polyethers containing hydroxyl groups are those of the type known per se and are produced, for example, by the polymerization of epoxides such as ethylene oxides, propylene oxide, butylene oxide, tetrahydrofuran, styrene oxide or epichlorohydrin with themselves, for example, in the presence of Lewis catalysts such as boron trifluoride or by the addition of these epoxides, preferably of propylene oxide, either as a mixture or successively, to starting components containing reactive hydrogen atoms such as water, alcohols, ammonia or amines, for example, ethylene glycol, propylene glycol-(1,3) or -(1,2), trimethylol propane, glycerol, sorbitol 4,4'-dihydroxydiphenylpropane, aniline, ethanol amine or ethylene diamine. Polyethers started on formitol or formose (German Offenlegungsschriften Nos. 2,639,083 or 2,737,951) can also be used according to the invention. Those polyethers which predominantly (more than 90% by weight, based on all the hydroxyl groups present in the polyether) contain secondary hydroxyl groups, are preferred.

The polyesters containing hydroxyl groups which can be used as components (c) in the structure of the hydroxyl prepolymer include, for example, reaction products of polyhydric, preferably dihydric, optionally additionally trihydric alcohols with polyvalent, preferably divalent carboxylic acids. The corresponding carboxylic acid anhydrides or corresponding polycarboxylic acid esters of lower alcohols or their mixtures can be used instead of free polycarboxylic acids, to produce the polyesters. The polycarboxylic acids can be aliphatic, cycloaliphatic, aromatic and/or heterocyclic and may be substituted, for example by halogen atoms and/or be unsaturated.

Examples of such carboxylic acids and derivatives thereof include:

Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, which may be mixed with monomeric unsaturated fatty acids such as oleic acid, terephthalic acid dimethyl ester and terephthalic acid bis-glycol ester. Suitable polyhydric alcohols include, for example, ethylene glycol, propylene glycol-(1,2) and -(1,3), butylene glycol-(1,4) and -(2,3), hexane diol-(1,6), octane diol-(1,8), neopentyl glycol, 1,4-bis-hydroxy methyl cyclohexane, 2-methyl-1,3-propane diol, glycerol, trimethylol propane, hexane triol-(1,2,6), butane triol-(1,2,4), trimethylol ethane, pentaerylthrol, quinitol, mannitol and sorbitol, formitol, methyl glycoside, also diethylene glycol, triethylene glycol, tetraethylene glycol and higher polyethylene glycols, dipropylene glycol and higher polypropylene glycols as well as dibutylene glycol and higher polybutylene glycols. The polyesters may contain a proportion of terminal carboxy groups. Polyesters derived from lactones, for example, ε-caprolactone, or from hydroxycarboxylic acid, for example, ω-hydroxycapronic acid, can also be used.

Polyesters of adipic acid and ethylene glycol, propylene glycol or butane diol, in particular polypropylene glycol adipates are preferred. Castor oil can also be used as polyester component (c).

Representatives of the said compounds to be used according to the invention are described, for example, in High Polymers, Vol. XVI, "Polyurethanes Chemistry and Technology" written by Saunders-Frisch, Interscience Publishers, New York, London, Volume I, 1962, pages 32 to 42 and pages 44 to 54 and Volume II, 1964, pages 5 to 6 and 198 to 199, and in Kunststoff-Handbuch, Volume VII, Vieweg-Hochtlen, Carl-Hanser-Verlag, Munich, 1966, for example on pages 45 to 71.

Glycols d) of lower molecular weight which are suitable for the production of the prepolymer component B) include, for example: ethylene glycoll propylene glycol(1,2) and -(1,3), butylene glycol-(1,4) and -(2,3), pentane diol-(1,5), hexane diol-(1,6), octane diol-(1,8), neopentyl glycol, 1,4-bis-hydroxy methyl cyclohexane, 2-methyl-1,3-propane diol, dibromobutene diol; diethylene glycol, triethylene glycol, tetraethylene glycol, higher polyethylene glycols having a molecular weight of up to about 250, dipropylene glycol, higher polypropylene glycols having a molecular weight of up to about 250, dibutylene glycol, 4,4'-dihydroxy diphenyl propane, di-hydroxy methyl-hydroquinone, diethanol amine and N-methyldiethanol amine.

Ester diols corresponding to the following general formulae are other lower molecular diols which are suitable according to the invention and have a molecular weight of up to about 250:

$$HO-(CH_2)_x-CO-O-(CH_2)_y-OH$$

and $$HO-(CH_2)_x-O-CO-R-CO-O-(CH_2)_x-OH$$

in which

R represents an alkylene radical containing 1 to 10 preferably 2 to 6 carbon atoms or a cycloalkylene or arylene radical with 6 to 10 carbon atoms;

x=2–6 and y=3–5 for example, δ-hydroxybutyl-ε-hydroxy-capronic acid ester; ω-hydroxyhexyl-γ-hydroxybutyric acid ester; adipic acid-bis-(β-hydroxyethyl) ester and terephthalic acid-bis-(β-hydroxyethyl) ester. Diolurethanes corresponding to the general formula $$HO-(CH_2)_x-O-CO-NH-R'-NH-CO-O-(CH_2)_x-OH$$

in which

R' represents an alkylene radical containing 2 to 15, preferably 2 to 6 carbon atoms or a cycloalkylene or arylene radical containing 6 to 15 carbon atoms and x represents a number between 2 and 6 for example, 1,6-hexamethylene-bis-(β-hydroxyethylurethane) or 4,4'-diphenylmethane-bis-(δ-hydroxybutylurethane); as well as diol ureas corresponding to the general formula

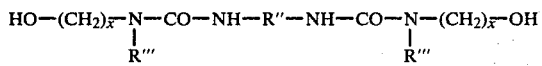

in which
R" represents an alkylene radical containing 2 to 15, preferably 2 to 9 carbon atoms or a cycloalkylene or arylene radical containing 6 to 15 carbon atoms,
R''' represents hydrogen or a methyl group and
x represents the numbers 2 or 3, for example, 4,4'-diphenylmethane-bis-(β-hydroxyethyl urea) or the compound

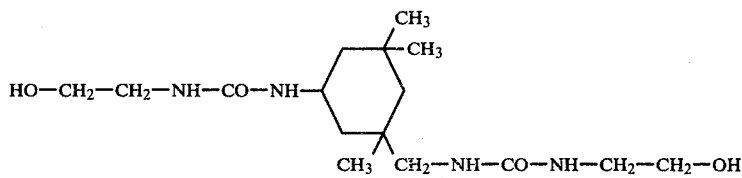

Diols (d) which are preferred according to the invention include diethylene glycol, triethylene glycol, propylene glycol, dipropylene glycol and tripropylene glycol. Dipropylene glycol is particularly preferred.

It is essential to the invention that a small amount (about 0.5 to 5% by weight, preferably about 1 to 2% by weight, based on the sum of the compounds which are reactive towards isocyanates) of an amino-functional compound, for example, a polyamine (preferably an aromatic diamine), hydrazine or hydrazide is also used during the production of the OH-prepolymer.

Aliphatic diamines which are suitable for use according to the invention include for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophorone diamine") 2,4- and 2,6-hexahydrotoluylene diamine and mixtures thereof; perhydro-2,4'- and 4,4'-diaminodiphenyl methane; p-xylylene diamine, bis-(3-aminopropyl)-methyl amine; diaminoperhydroanthrazenes (German Offenlegungsschrift No. 2,638,731) and cycloaliphatic triamines according to German Offenlegungsschrift No. 2,614,244. Hydrazine, and substituted hydrazines, for example methyl hydrazine, N,N'-dimethylhydrazine and homologues thereof as well as acid dihydrazides can also be used according to the invention, for example carbodihydrazides; oxalic acid dihydrazide; the dihydrazides of malonic acid; succinic acid; glutaric acid; adipic acid, β-methyl adipic acid, sebacic acid, hydracrylic acid and terephthalic acid; semicarbazido-alkylene-hydrazides such as, for example, β-semicarbazido propionic acid hydrazide (German Offenlegungsschrift No. 1,770,591), semicarbazido alkylene carbazine esters such as, for example, 2-semi-carbazido ethyl carbazinester (German Offenlegungsschrift No. 1,918,504) or also amino semi-carbazide compounds such as, for example, β-amino-ethyl-semicarbazido-carbonate (German Offenlegungsschrift No. 1,902,931).

Examples of aromatic diamines include bisanthranilic acid esters according to German Offenlegungsschriften Nos. 2,040,644 and 2,160,590; 3,5- and 2,4-diamino benzoic acid ester according to German Offenlegungsschrift No. 2,025,900; diamines containing ester groups, described in German Offenlegungsschriften Nos. 1,803,635 (U.S. Pat. Nos. 3,681,290 and 3,736,350 both incorporated herein by reference), 2,040,650 and 2,160,589, the diamines containing ether groups according to German Offenlegungsschriften Nos. 1,770,525 and 1,809,172 (U.S. Pat. Nos. 2,654,364 and 3,736,295 both incorporated herein by reference); 2-halogen-1,3-phenylene diamines which may be substituted in the 5-position (German Offenlegungsschriften Nos. 2,001,772, 2,025,896 and 2,065,869), 3,3'-dichloro-4,4'-diamino-diphenyl methane, toluylene diamine, 4,4'-diaminodiphenyl methane, 4,4'-diamino-diphenyl disulphides (German Offenlegungsschrift No. 2,404,976), diamino-diphenyl dithioether (German Offenlegungsschrift No. 2,509,404), aromatic diamines substituted by alkylthio groups (German Offenlegungsschrift No. 2,638,760), diaminobenzene phosphonic acid ester (German Offenlegungsschrift No. 2,459,491), aromatic diamines containing sulphonate or carboxylate groups (German Offenlegungsschrift No. 2,720,166), and the diamines having high melting points listed in German Offenlegungsschrift No. 2,635,400. The amino alkyl thioanilines according to German Offenlegungsschrift No. 2,734,574 are examples of aliphatic-aromatic diamines. Toluylene diamines which are substituted at the nucleus with methyl and/or ethyl groups such as, for example, 3,5-diethyl-2,4-diamino toluene are preferred.

The zeolites which are commercially available as molecular sieves for example, are used according to the invention as sodium aluminum silicates f).

Suitable activators g) according to the invention include polyurethane catalysts of the type known per se, for example, tertiary amines, such as triethyl amine; tributyl amine; N-methyl morpholine; N-ethyl morpholine; N,N,N',N'-tetramethyl-ethylene diamine; pentamethyldiethylene triamine and higher homologues (German Offenlegungsschriften Nos. 2,624,527 and 2,624,528), 1,4-diazabicyclo-(2,2,2)-octane; N-methyl-N'-dimethylaminoethyl piperazine; bis-(dimethylaminoalkyl)-piperazines, (German Offenlegungsschrift No. 2,636,787); N,N-dimethylbenzyl amine; N,N-dimethylcyclohexyl amine; N,N-diethylbenzyl amine; bis-(N,N-diethylaminoethyl)-adipate; N,N,N',N'-tetramethyl-1,3-butane diamine; N,N-dimethyl-β-phenylethyl amine, 1,2-dimethyl imidazole, 2-methyl imidazole, monocyclic and bicyclic amidines, (German Offenlegungsschrift No. 1,720,633), bis-(dialkylamino) dialkyl ether (U.S. Pat. No. 3,330,782; German Auslegeschrift No. 1,030,558; German Offenlegungsschriften Nos. 1,804,361 and 2,618,280) and tertiary amines containing amide groups (preferably formamide groups) according to German Offenlegungsschriften Nos. 2,523,633 and 2,732,292. Suitable catalysts include Mannich bases known per se of secondary amines such as dimethyl amine and aldehydes, preferably formaldehyde, or ketones such as acetone, methylethyl ketone or cyclohexanone and phenols such as phenol, nonylphenol or bisphenol.

Tertiary amines containing hydrogen atoms which are active toward isocyanate groups, as catalysts include for example, triethanol amine, triisopropanol amine, N-methyl-diethanol amine, N-ethyl-diethanol amine, N,N-dimethyl-ethanol amine, the reaction products thereof with alkylene oxides such as propylene oxide and/or ethylene oxide as well as secondary tertiary amines according to German Offenlegungsschrift No. 2,732,292.

Suitable catalysts also include sila-amines with carbon-silicone bonds of the type described, for example, in German Pat. No. 1,229,290 (corresponding to U.S. Pat. No. 3,620,984 incorporated herein by reference), for example, 2,2,4-trimethyl-2-sila-morpholine and 1,3-diethyl amino methyl-tetramethyl-disiloxane.

Nitrogen-containing bases such as tetraalkyl ammonium hydroxides, alkali metal hydroxides such as sodium hydroxide, alkali metal phenolates such as sodium phenolate or alkali metal alcoholates such as sodium methylate can also be used as catalysts. Hexahydrotriazines can also be used as catalysts (German Offenlegungsschrift No. 1,769,043).

The reaction between NCO-groups and Zerewitinoffactive hydrogen atoms is greatly accelerated by lactams and azalactams, an association between the lactam and the compound with acidic hydrogen initially being formed. Associations of this type and their catalytic effect are described in German Offenlegungsschriften Nos. 2,062,288; 2,062,289; 2,117,576 (U.S. Pat. No. 3,758,444 incorporated herein by reference); 2,129,198; 2,330,175 and 2,330,211.

Organometallic compounds in particular organotin compounds, can be used as catalysts according to the invention. In addition to sulphur-containing compounds such as di-n-octyl tin mercaptide (German Auslegeschrift No. 1,769,367; U.S. Pat. 3,645,927 incorporated herein by reference), it is preferred to use as organo-tin compounds the tin (II) salts of carboxylic acids such as tin (II)acetate, tin(II)-octoate, tin(II)-ethyl hexoate and tin(II)laurate and tin(IV)-compounds, for example dibutyl tin oxide, dibutyl tin dichloride, dibutyl tin diacetates, dibutyl tin dilaurate, dibutyl tin maleate or dioctyl tin diacetate.

All the above-mentioned catalysts can of course be used as mixtures. Combinations of organic metal compounds, in particular metal salts of carboxylic acids (for example the Pb-salt of 2-ethyl hexanic acid) with amine catalysts such as diazabicyclo octane are of particular interest. Catalyst combinations of this type lead to coating compositions having a particularly long pot-life at room temperature but still having a short curing time when heated (for example, three minutes at 100° C.).

Other examples of catalysts which can be used according to the invention and details about the mode of operation of the catalysts are described in Kunststoff-Handbuch, Volume VII, edited by Vieweg and Hochtlen, Carl-HanserVerlag, Munich 1966, for example on pages 96 to 102.

Surface-active additives such as emulsifiers can also be used according to the invention. Suitable emulsifiers include for example, the sodium salts of castor oil sulphonates or salts of fatty acids with amines such as oleic acid diethyl amine or stearic acid diethanol amine. Alkali or ammonium salts of sulphonic acids such as those of dodecyl benzene sulphonic acid or dinaphthyl methane disulphonic acid or of fatty acids such as ricinoleic acid or of polymeric fatty acids can also be used as surface-active additives.

Reaction retarders can also be used according to the invention, if desired, for example, acid reacting materials such as hydrochloric acid or organic acid halides, as can cell regulators of the type known per se such as paraffins, fatty alcohols or dimethyl polysiloxanes as well as pigments or dyestuffs and flame retardants of the type known per se, for example tris-chloroethyl phosphate, tricresyl phosphate or ammonium phosphate and poly-phosphate. Stabilizers against the influences of ageing and weathering, plasticizers and substances having a fungistatic and bacteriostatic effect as well as fillers such as barium sulphate, kieselguhr, carbon black or whiting can also be used.

Other examples of surface-active additives and foam stabilizers as well as cell regulators, reaction retarders, stabilizers, flame retarding substances, plasticizers, dyestuffs and fillers as well as fungistatically and bacteriostatically acting substances which can be used according to the invention as well as details about modes of application and operation of these additives are described in Kunststoff-Handbuch, Volume VII, edited by Vieweg and Hochtlen, Carl-HanserVerlag, Munich 1966, for example on pages 103 to 113.

In order to produce the components B) of the coating compositions according to the invention, the compounds A) to e) described in detail above are reacted together in a one-shot process at a NCO/(OH+NH)-equivalent ratio of about 0.25:1 to 0.65:1, preferably about 0.35:1 to 0.60:1, particularly preferably about 0.50:1 to 0.55:1. As mentioned above, the polyester polyol (c) which may be used simultaneously can also be added only to the finished OH prepolymer. The components (f) and (g) are preferably also used during the production of the OH prepolymer, but they can also be mixed with the finished OH prepolymer (B) and the solid polyisocyanate (A)—as can other additives which may be used.

The polyurethane reactive systems according to the invention which are stable in storage are suitable for coating a wide variety of substrates. In addition to flat textile substrates, fabric tubes can also preferably be coated by means of coating installations known per se.

In order to provide the support material, for example, a polyester fabric, with the polyurethane coating according to the invention, the coating composition is applied to the support in the desired thickness of the layer, for example by means of a doctor, brush, roller, or the like. The method of application is not subject to any restrictions because of the extremely long pot-life of the systems. There is no risk of the doctor gelling or curing.

After application, the support material provided with the coating can, for example, be passed through a heating duct, guided over a heating table or drawn through an IR field for the curing process. This operation can be performed, for example, at temperatures between about 80° and 180° C., depending upon the thermal load which the substrate to be coated can withstand. The setting times of the coating accordingly lie between about 1 and 5 minutes. The coating operation can be performed both horizontally and vertically owing to the excellent intrinsic viscosity of the polyurethane systems, without compositions applied running in the heat.

The following examples illustrate the present invention. The references to quantities should be understood as parts by weight or percentage by weight unless otherwise stated.

EXAMPLE 1

In order to produce a hydroxyl-terminated prepolymer, 80 parts of a partially branched polypropylene glycol (OH No: 42, functionality f=2.75)
20 parts dipropylene glycol,
5 parts Na-Al-silicate (a 50% suspension in the above-mentioned polyether),
2 parts polypropylene glycol adipate (molecular weight: 820),
1 part 4-methyl-2,6-diethyl-1,3-diamino benzene and
0.5 parts diazabicyclooctane (33% in dipropylene glycol) with
18 parts 2,4-toluylene diisocyanate are reacted with constant stirring. The reaction temperature increases to about 60° C. in the process. The reaction is terminated after about 1 hour.

17 parts dimeric 2,4-toluylene diisocyanate are incorporated into 100 parts of this OH prepolymer in a suitable mixer or by means of rubbing-in roller at room temperature. 1% of an activator mixture consisting of 88% diazabicyclooctane (33% in dipropylene glycol) and 12% lead octoate (24% in white spirit) are subsequently stirred into the mixture produced.

The paste produced in this way is storage stable for several months at room temperature. The storage stability lasts for two weeks at 50° C. The mixture sets within 1 to 3 minutes when heated to 100° C. The paste can optionally be dyed using suitable color pigments.

The following physical values were determined on the cured polyurethane:
Density—1,065 Mg/m$^3$
Shore hardness A (DIN 53505)—81
Tensile strength (DIN 53504)—7.23 mPa
Breaking elongation (DIN 53504)—100%
Abrasion (DIN 53516)—141 mm$^3$.

EXAMPLE 2

The following process was adopted for the production of a more rigid coating material:
80 parts of the polyether from Example 1,
20 parts propylene glycol-1,2,
5 parts Na-Al-silicate (50% suspension in the above-mentioned polyether),
2 parts of the polypropylene glycol adipate from Example 1,
1.5 parts diethyltoluylene diamine and
0.5 parts diazabicyclooctane (33% in dipropylene glycol)
are reacted with 27 parts 2,4-toluylene diisocyanate with stirring. The reaction temperature increases to from 80° to 100° C. depending upon the quantity of mixture.

After cooling, 24 parts dimeric 2,4-toluylene diisocyanate are incorporated into 100 parts of the hydroxyl-terminated prepolymer thus obtained, as described in Example 1.

The mixture is subsequently activated as in Example 1. This reactive paste is also stable in storage for months at room temperature, but cures within 1 to 3 minutes at 100° C.

Test data measured on fully reactive material:
Density—1,035 Mg/m$^3$
Shore hardness A/D—89/40
Tensile strength—12.06 mPa
Breaking elongation—208%
Elasticity—26%
Abrasion—184 mm$^3$

EXAMPLE 3 (Comparison Experiment)

Production of a hydroxyl-terminated prepolymer with a linear polyether:
80 parts of linear polypropylene glycol (OH No:56),
20 parts dipropylene glycol,
5 parts Na-Al-silicate (50% suspension in the polyether from Example 1),
2 parts of the polypropylene glycol adipate from Example 1,
1 part diethyl toluylene diamine and
0.5 parts diazabicyclooctane (33% in dipropylene glycol)
are reacted with 17 parts toluylene diisocyanate, as in the preceding examples.

20 parts dimeric toluylene diisocyanate are incorporated into 100 parts of this prepolymer.

The resulting paste cures with the same activation after only 10 minutes at 100° C., using the activator mixture described in Example 1. The surface remains tacky.

EXAMPLE 4

80 parts of a trifunctional ethoxylated polypropylene oxide with terminal primary hydroxyl groups (OH No:36)
20 parts dipropylene glycol,
5 parts Na-Al-silicate (as 50% suspension in the polyether from Example 1),
2 parts polypropylene glycol adipate,
1 part diethyl toluylene diamine and
0.5 parts diazabicyclooctane (33% in dipropylene glycol)
are reacted with 17 parts toluylene diisocyanate.

A paste is subsequently produced using 18 parts of the dimeric 2,4-toluylene diisocyanate on 100 parts of the prepolymer. After activation using 1% activator mixture according to Example 1, thorough curing is achieved within 20 seconds at 100° C. However, the paste is only stable in storage for about eight hours at room temperature.

EXAMPLE 5 (Comparison Experiment)

80 parts of the polyether from Example 1,
20 parts dipropylene glycol,
5 parts Na-Al-silicate (as 50% suspension in the polyether from Example 1),
2 parts polypropylene glycol adipate and
0.5 parts glycol and 0.5 parts diazabicyclooctane (33% in dipropylene glycol)
are reacted with 17 parts toluylene diisocyanate.

The recipe corresponds to the one according to Example 1, but without the diamine. Shortly after the isocyanate has been stirred in, the urethane rigid segment formed precipitates in granular form. The subsequent processing with dimeric isocyanate does not lead to a homogeneous final product.

EXAMPLE 6 (Comparison Experiment)

Example 2 is repeated without using the polyester polyol:

The viscosity of the mixture of hydroxyl-prepolymer and dimeric toluylene diisocyanate increases greatly after only a few hours so that the material can no longer be processed.

EXAMPLE 7 (Comparison Experiment)

Example 1 is repeated without zeolite.

After mixing the hydroxyl prepolymer with dimeric toluylene diisocyanate and activation, a paste is obtained which is stable in storage for about four weeks at room temperature. The stability at 50° C. is about 3 days. When the coating composition is heated, gas is formed in an uncontrolled manner and spongy elastomers are obtained.

EXAMPLE 8 (Comparison Experiment)

Reaction of a polyol mixture with dimeric isocyanate without preliminary chain-lengthening with monomeric toluylene diisocyanate:

80 parts of the polyether from Example 1,
20 parts dipropylene glycol,
5 parts Na-Al-silicate (50% suspension in the polyether),
1 part diethyl toluylene diamine according to Example 1
0.5 parts diazabicyclooctane (33% in dipropylene glycol)

are mixed homogeneously with 39 parts dimeric toluylene diisocyanate. The mixture is subsequently activated using 1% activator mixture as in Example 1.

The paste produced sets within two minutes at 110° C. but remains flexible and tacky, in contrast to the polyurethane from Example 1. Although the paste is still of a putty-like consistency after 24 hours storage at room temperature, curing is even less complete at 110° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
(A) about 5–30% by weight of a polyisocyanate having a melting point above about 100° C. and
(B) about 95–70% by weight of a polyhydroxyl compound, characterized in that component (B) is a prepolymer containing hydroxyl groups of
  (a) a polyisocyanate,
  (b) about 50 to 85% by weight, based on the sum of components (b) to (e) of a partially branched polyether polyol having a molecular weight of from about 1000 to 4500,
  (c) about 0 to 10% by weight of a polyester polyol having a molecular weight of about 500 to 2000,
  (d) about 10 to 30% by weight of a glycol having a molecular weight of from about 62 to 250 and
  (e) about 0.5 to 5% by weight of a compound containing at least two primary or secondary amino groups
wherein the equivalent ratio or component (a) to components (b) to (e) lies between about 0.25 and 0.65, and wherein (B) contains
  (f) about 1 to 4% by weight of a zeolite molecular sieve, and
  (g) about 0.1 to 5% by weight of a catalyst for isocyanate addition reactions.

2. Coating compositions according to claim 1, characterized in that they comprise
(A) about 10 to 20% by weight of a diisocyanate having a melting point above 125° C. and
(B) about 80 to 90% by weight of a hydroxyl prepolymer which was produced by reaction of
  (a) a diisocyanate with
  (b) about 65 to 80% by weight, based on the sum of components (b) to (e), of a polyether polyol having an average hydroxyl functionality of about 2.5 to 3, which is predominately contributed by secondary hydroxyl groups and has a molecular weight of from about 2000 to 4000,
  (c) about 1 to 5% by weight of an adipic acid polyester having a molecular weight of from about 700 to 1200,
  (d) about 15 to 25% by weight of a glycol having a molecular weight of from about 76 to 150, and
  (e) about 1 to 2% by weight of an aromatic diamine having a molecular weight of below 200, wherein the equivalent ratio of (a) to the sum of components (b) to (e) lies between about 0.35:1 and 0.6:1.

3. A substantially solvent-free process for preparing polyurethane treated flexible substrates comprising
(A) coating the substrate with the composition of claim 1, and
(B) curing the coating composition at temperatures between about 80° and 180° C. for between about 1 and 5 minutes.

4. A process for preparing substantially solvent-free fast low temperature curing coating compositions with long shelf-life comprising
  (a) forming hydroxyl bearing prepolymer from:
    (i) a polyisocyanate,
    (ii) about 50 to 85 wt.%, based on the weight of ii to v, of a branched polyether having an average hydroxyl functionality of between about 2.5 and 3.0 and a $\overline{M}n$ of between about 2000 and 4000,
    (iii) about 0 to 10 wt.%, based on the weight of ii to v, of a polyester polyol having a $\overline{M}n$ of between about 500 and 2000,
    (iv) about 10 to 30 wt.%, based on the weight of ii to v, of a glycol having a molecular weight of between about 62 and 250, and
    (v) about 0.5 to 5 wt.%, based on the weight of ii to v, of a compound containing at least two primary or secondary amino groups,
  said polyisocyanate being present in sufficient quantity to give a NCO to achieve hydrogen ratio of between about 0.25 and 0.65,
  (b) combining said prepolymer either before or after its synthesis with
    (i) about 1 to 4 wt.%, based on the weight of said prepolymer, of a molecular sieve of the aluminum silicate type, and
    (ii) about 0.1 to 5 wt.%, based on the weight of said prepolymer of a catalyst for isocyanate addition reactions, and
  (c) after synthesis of said prepolymer mixing it with about 5 to 30 wt.%, based on the weight of prepolymer and this component, of a polyisocyanate having a melt point above about 100° C.

* * * * *